Feb. 6, 1968    H. A. C. THIJSSEN ET AL    3,367,787
EVAPORATION CONCENTRATION OF LIQUIDS
Filed Jan. 20, 1964    2 Sheets-Sheet 1

Feb. 6, 1968 H. A. C. THIJSSEN ET AL 3,367,787
EVAPORATION CONCENTRATION OF LIQUIDS
Filed Jan. 20, 1964 2 Sheets-Sheet 2

United States Patent Office 3,367,787
Patented Feb. 6, 1968

3,367,787
EVAPORATION CONCENTRATION OF LIQUIDS
Henricus Alexis Cornelis Thijssen, 32 Hertog Janstraat, and Ernst Jan Cornelis Paardekooper, 15 Haydnstraat, Bois-le-Duc, Netherlands
Filed Jan. 20, 1964, Ser. No. 338,776
Claims priority, application Netherlands, Jan. 25, 1963, 288,186
11 Claims. (Cl. 99—199)

ABSTRACT OF THE DISCLOSURE

Evaporation concentration of liquids through a semi-permeable membrane formed in situ by evaporation of the process liquid to be concentrated, or another liquid, with consequent deposition in membrane form of an organic hydrophilic material present in that liquid.

---

This invention relates to the treatment of liquids.

The removal of water (partly or wholly) from liquids is generally brought about by evaporation or fractional distillation. Frequently, however, these methods cannot be used with complete success, for example when dehydrating, either partially or completely, liquids obtained by pressing, comminuting or extracting materials of vegetable or animal origin. In attempts to concentrate these liquids by evaporation, it is found that a large proportion of their valuable components, for example flavouring substance, is lost.

It has been suggested to collect valuable substances which are carried along with the water vapour, by a separate fractionation, and to return the enriched fraction to the concentrated liquid. This rather circuitous method, however, does not provide a completely satisfactory solution to the problem for it is very difficult to get the various volatile organic substances, which constitute the aroma of the natural product and have widely divergent volatilities, in one concentrated fraction. Also, the flavouring substances will often not be stable under the conditions which prevail during the process of distillation and fractionation.

Another example of substances which cannot be dehydrated by simple evaporation is found in the class of liquids containing azeotropic mixtures of which water is one component; yet another example is the class of liquids containing, in addition to water, organic substances having a boiling point close to that of water, or which are generally volatile with water.

It has been suggested to concentrate aqueous solutions by passing them over a thin semi-permeable membrane so that water passes through the membrane and evaporates from the other side. However, such procedures have the disadvantages that the thin membranes (for example, of cellophane) may be weak and they may suffer from "poisoning" or "blocking" whereby their efficiency rapidly becomes impaired.

Consequently frequent renewal of such membranes is essential However such replacement is inconvenient, involving as it does the manipulation of relatively large sheets of fragile material, with the likelihood of contamination by undesirable microorganisms, and the trouble of opening the apparatus.

We have now found that these disadvantages may substantially be avoided by forming the selectively permeable layer in situ by accumulation of material which is readily renewable.

Accordingly the present invention provides a method of dehydrating liquids, in which process liquid is caused to flow along and in contact with a non-gaseous selectively permeable layer formed in situ by accumulation of easily renewable hydrophilic material, and maintaining a relatively low water vapour pressure at the other side of the selectively permeable layer.

The layer may be formed by accumulation of materials present in the liquid to be dehydrated, or previously from substances contained in a "pre-treat" liquid.

The formation of the selectively permeable layer, either from the liquid out of which water has to be removed or from the "pretreat" liquid is enhanced by providing means which restrict the flow in the surface layer of the liquid.

The flow restricting means may be a thin finely perforated sheet of solid material which under the working conditions employed is inert and insoluble but which is readily wettable by the liquid being treated and it is situated in the surface layer of said liquid. It is postulated that by employing such a flow restricting means the surface of the liquid is, as it were, subdivided in tiny stagnant or substantially stagnant pools in which by evaporation of liquid an accumulation takes place of the substances which are necessary to impart selective permeability to the surface layer (and which will be described below). This accumulation may proceed so far as to lead eventually to the formation of a solid or semi-solid layer within the confines of the perforations in the thin solid sheet which is situated at the interface of the liquid and the vapour.

In a preferred method of application the thickness of the sheet is from $10\mu$ to $100\mu$, especially $35\mu$ to $75\mu$, and the perforations have a surface area of $25\mu^2$ to $10,000\mu^2$, especially $1,000\mu^2$ to $5,000\mu^2$, each. Naturally for high efficiency the perforations have to be as numerous as possible.

Conveniently the perforated sheet consists of a mesh of metallic wire or threads of natural or synthetic origin. Stainless steel gauze of 150–250 mesh, made of wire with a diameter of $25\mu$ to $75\mu$ has proved very effective in applying the invention. The mesh may be made from glass threads or threads made from natural fibres, for example silk, or of synthetic origin, for example rayon.

The perforated sheet may also be made from felted natural or synthetic fibres, for example cellulose. Also the perforated sheet may consist of or comprise sintered metal, plastic, glass and the like.

Further the said sheet may consist of a natural or synthetic substantially non-selective water-permeable membrane.

It is obvious that the need for a flow restricting sheet in the surface layer of the liquid is the more pronounced the more dilute the liquid is with regard to the selective permeability imparting substances (which will be discussed more in detail below), and generally the more dilute the liquid, the finer the perforations of flow restricting sheet must be.

The mechanism by which it is thought the perforated solid sheet performs its function of enhancing the formation of a selectively permeable layer may be understood more readily by reference to FIG. 1, in which 1 denotes a cross-section of some horizontal wires forming part of the mesh of which the perforated sheet in this case consists, the wires having a diameter of, for example, $50\mu$, 2 denotes a flow of gas used to enhance evaporation, 3 is the vapour-liquid interface, 4 denotes the flow of liquid from which water is being removed, 5 is the surface layer in which the selective permeability imparting material is being accumulated by the evaporation of liquid in the little stagnant "pools" between the wires, and 6 denotes the thickness of the zone of restricted flow (in this case approximately $50\mu$).

It has been found that the selectively permeable layer may be very conveniently formed from the liquid itself from which the water has to be removed. For that purpose the liquid must contain normally solid, organic, hydrophilic material in solution and/or in a finely dispersed state. Colloidal, gel-forming substances are especially effective. It is believed that the substances exhibiting the desired properties are those the molecules of which can assemble a "mantle" of loosely bound water molecules around themselves. Carbohydrates may be used, such as starches, dextrins sugars, gums or pectins, as well as proteins, for example albumins, casein and gelatins. Gum-like substances which may be employed include gum tragacanth and gum arabic. Mixtures of these substances are likewise useful. Finely dispersed structurized solid material, particularly fibrous material which in itself has selectively permeable properties may be of help as building material for the selectively permeable layer. Natural or synthetic cellulose fibres, fibres of disintegrated parchment, fibres of collagen, whole or disintegrated cells present in fluids of vegetable or animal origin, are all examples of such finely dispersed solid structurized material, useful for the purpose under consideration.

Many fluids of vegetable or animal origin contain in themselves the material which is necessary for the formation of the selectively permeable layer. Thus many of these fluids can be treated according to the invention without any treatment of the apparatus to preform a film in situ and without having recourse to any addition of foreign material. Juices obtained by comminuting, pressing, extracting or enzymatically digesting material of vegetable or animal origin or by a combination of these measures, may be treated in this way.

Examples of juices obtained by pressing or comminuting are tomato juice, plum juice and apple juice. Coffee extract is an example of a liquid obtained by extraction. Beer and cider are examples of enzymatically treated material. Apple sauce may serve as a good illustration of a liquid which also contains structurized solid material that in itself has selectively permeable properties, these being fibres and partly disintegrated cells.

In all these cases when the liquid is obliged to flow for example at one side of and in contact with a finely perforated sheet as described above and water is evaporated at a sufficiently rapid rate by maintaining at the other side of the sheet a sufficiently low water vapour pressure, the above-mentioned selective permeability imparting substances will accumulate in the surface layer with the desired effect. It is believed that with increase of the concentration of the substances in question in the sheet, the diffusion rate for the volatile organic compounds which have to be retained decreases much more than does the diffusion rate of water.

Referring again to FIG. 1, it will be seen that there is a gradient of the water content in the selectively permeable layer. The water content may be quite low at the interface of liquid and vapour, e.g. 3–10%.

Without restricting himself by any theory the applicant makes the following remarks:

The selectively permeable surface layer which is formed from substances contained in the liquid seems to be in a state of "dynamic equilibrium" with the liquid, which is to say that there is a constant interchange of substance between the selective layer and the liquid. Thus the selectively permeable layer perhaps may be regarded as more or less continuously self-renewing.

However, as soon as the throughput or the selectivity of the layer is diminished (as the case may be by the accumulation of undesirable substances in the layer), the liquid being treated may be withdrawn from the apparatus. The layer which has formed itself in the perforated sheet may be washed away, for example with cold or warm water, and the liquid to be treated is reintroduced.

In cases where the quantity of "building" material in the liquid is insufficient to form an effective selectively permeable layer, suitable material such as one or more of those mentioned earlier may be added to the liquid to be treated.

It may sometimes be advantageous to use a selectively permeable layer, or to start by using such a layer, which has been formed from another liquid containing building material for a selectively permeable layer according to the described method. We may call this a "pretreat" liquid. After the selectively permeable layer has been formed, the "pretreat" liquid is substituted by the liquid which has to be dehydrated. It is clear that in this case the layer must have a solid or semi-solid constitution. For example a selectively permeable layer formed from prune juice has been used for concentrating coffee extract and apple juice according to the invention. Also layers formed by solutions of gelatin, pectin, etc. may be made in this way. Often by using this kind of preformed layer, there will be an exchange of particles between the layer and the liquid which has to be dehydrated, and by this process the original material of the layer may be replaced, at least partly, by material derived from the liquid which has to be dehydrated.

In other cases it is necessary, or advisable to use as selectively permeable layer a layer formed in situ by pretreatment, which is insoluble in water. Again, the building material of the layer must be hydrophilic to exhibit the desired properties of selective permeability, which is to say that the molecules in the layer must be able to assemble a "mantle" of loosely bound water molecules around themselves, which usually implies swelling of the layer.

An organic solvent or a mixture of an organic solvent and water may be used as a carrier for building material in solution which is insoluble in the watery medium that ultimately is to be dehydrated. As soon as this kind of selectively permeable layer becomes ineffective it may be washed away in situ, for example by the solvent which was used in its formation. Also, some layers may be destroyed by "burning away" for example, by the introduction of hot air or oxygen. A layer of cellulose-acetate may be formed and also dissolved by an acetone or acetone-water solution of this substance. A layer may also be formed from water-soluble building material which, after formation but before introduction of the liquid which has to be dehydrated, is rendered water-insoluble by a "curing" process. For example a solution of sodium carboxymethylcellulose in water may be used and the layer formed may be "cured" by lowering the pH. Acid may be applied in solution or in a gaseous state (HCl, formic acid, acetic acid), alternatively a buffered solution can be used. The "cured" layer may subsequently be removed, for example by a solution of sodium hydroxide.

The selectively permeable layer, after having been formed in situ in the solid finely perforated sheet, may be subjected to any "curing" treatment for developing or enhancing its selective permeability, and its resistance to mechanical stress and heat.

It is obvious that the use of a selectively permeable layer preformed in situ, while optional or desirable in certain cases, is essential in those cases in which the liquid to be dehydrated does not contain in itself adequate building material for a selectively permeable layer and addition of such material to the liquid is undesirable. This is the case with mixtures of alcohols and water, but also alcoholic beverages, such as wine, may contain insufficient building material for a selectively permeable layer and may be dehydrated advantageously by, for example; a hardened layer of carboxymethyl-cellulose formed in situ.

When dehydrating liquids of vegetable or animal origin, it is in many cases important to reduce as much as possible undesirable alterations brought about for example by chemical and/or biochemical reactions, such as enzymatic, oxidative, or hydrolytic action. For this reason the dehydration has to be effected as quickly as possible and especially the time during which the liquid is in contact with the selectively permeable layer, i.e. the time during which the liquid is in the diffusion cell has to be as short as possible. (In the cell the liquid in many cases being brought into contact—through the selectively permeable layer—with oxygen-containing gas and being held at an elevated temperature.) It is found that most liquids containing organic matter are much more stable after concentration by dehydration than in the original state. In order to shorten the residence time in the diffusion cell, the layer of the flowing liquid will generally be kept as thin as possible.

In one preferred method of carrying out the invention the diffusion cell consists of a frame in which two fine gauzes of stainless steel wire are situated parallel to each other and at a distance of about 1.5 mm. apart. However, other and widely different shapes of cell are also possible, e.g. tubular forms. When there is no danger of deterioration, the shape and dimensions of the cell are of course much less critical.

The low water vapour pressure at the vapour side of the selectively permeable layer, which is necessary to accomplish quick evaporation, can be brought about in several ways. A stream of relatively dry gas, such as air, can be maintained at the vapour side of the layer. In cases where oxygen is detrimental to the characteristics of the liquid we may substantially exclude the presence of oxygen by using for example nitrogen or carbon dioxide. The gas may be heated or at least have a temperature higher than that of the liquid. The functions of the gas therefore include firstly the maintenance of a low water vapour pressure at the vapour side of the selectively permeable layer, and secondly the carriage and delivery of energy necessary for the evaporation.

The low water vapour pressure which is necessary for quick evaporation can also be obtained by applying a vacuum at the vapour side of the selectively permeable layer or, more generally speaking, by maintaining at that side an absolute gas pressure which is substantially lower than the equilibrium vapour pressure of the liquid at the surface of the layer. When a solid layer, however flimsy, is formed in the finely perforated sheet, and especially when this sheet is supported at the vapour side (as will be described below), a large difference in pressure may be tolerated between the liquid side and the vapour side of the selectively permeable layer.

Yet another method of maintaining a low vapour pressure is the positioning of a condensing surface which is colder than the liquid which is being treated at a short distance from the selectively permeable layer. This is especially effective when a high vacuum is applied.

When one or both of the last two methods (vacuum and condensing surface) are used, the energy which is necessary for evaporation has to be supplied by the liquid itself. This means that the liquid has to be heated in some way to prevent the temperature from falling too low. The liquid can be heated outside the cell before entering it, as it is being recirculated or as it passes from one battery of cells to another. The liquid may also be heated while in the cell. For this purpose the cell may be specially constructed, consisting for example of a flat heat exchanger and a thin, finely perforated sheet positioned parallel to and at a short distance from it.

The pressure of the liquid being treated according to the invention may be lower or higher than the (absolute) pressure at the vapour side of the selectively permeable layer. When the pressure is lower and the finely perforated sheet has insufficient rigidity of itself (as is the case with, for example, a fine wire gauze), it is necessary to support it in some way. Conveniently, this may be done with "spacers" within the liquid which, however, do not substantially restrict the flow of the liquid. Very useful for this purpose are lengthwise spiralised wires (helices) placed with the axis of the spirals parallel to the flow of the liquid. In this way there is practically no obstruction to the flow of liquid, and no pressure differences can develop between the "sections" into which the helices divide the liquid in the cell.

By having at the liquid side of the finely perforated sheet a slightly lower pressure than at the vapour side, the liquid being introduced into the cell will only flow at one side of the sheet (the "inside" of the cell) as illustrated in FIG. 1. Thus it is possible for the selectively permeable layer to be formed (as extensively discussed above). Were the liquid to flow on both sides of the finely perforated sheet, the selectively permeable layer would not establish itself at all or at least not in the way desired and illustrated in FIG. 1.

By admitting a liquid flow between two spaced perforated sheets the liquid will, for large flow rates, have a tendency to flow at both sides of the sheets, especially when the sheets are readily wettable by the liquid. By diminishing the flow rate the flowing liquid will, by the influence of the cohesive forces of the liquid, tend to contract itself between the sheets.

If the resistance to flow becomes lower than the flow driving force (in the case of vertical gravitational flow this driving force is equal to the hydrostatic pressure gradient), the pressure of the flowing liquid between the stretched perforated sheets will become lower than the absolute pressure at the gas side.

The menisci in the perforations in the finely perforated sheet will by the influence of this sub-pressure in the liquid, be drawn back until an equilibrium has been established between the pressure difference and the opposing capillary pressure. The critical sub-pressure which will be tolerated before gas enters through the perforated sheets is directly proportional to the surface tension of the liquid, directly proportional to the cosine of the contact angle between liquid and perforated sheet and inversely proportional to the diameter of the perforations.

By the slightly lower pressure at the "inside" of the cell, the finely perforated sheet, in cases where it does not have sufficient rigidity and has to be supported by spacers, as described above, will, by its elasticity, tend to take on a concave shape between the spacers. It will be clear that small fluctuations in the flow of liquid in the cell will be smoothed out by the resilience of the sheet.

It is evident that an increase of the pressure difference between the gas side and the liquid side of the perforated sheets will result in a decrease of the average distance of the sheets relative to each other and subsequently to a decrease in the retention time of the liquid in the diffusion cell and the flow rate of the liquid. Thus it is possible within certain limits to regulate the flow rate by the said pressure difference. For example, when the pressure at the gas side is atmospheric all that it is necessary to do is to maintain a certain subatmospheric pressure above the liquid which is introduced into the cells.

If the pressure of the liquid being dehydrated is only slightly higher than the pressure at the vapour side of the finely perforated sheet the liquid will nevertheless not pass through this sheet if a more or less solid or semi-solid layer has been formed within the perforations. Though this layer as a separate membrane would be fairly or even very weak, within the tiny perforations the pressure difference between liquid and vapour side will only create a very small tangential tension in that layer. Thus pressure differences of up to 10 cm. mercury are resisted by films formed in gauzes of 200–250 mesh by many juices of vegetable or animal origin. If in these cases a high vacuum is applied at the vapour side, it is clear that the liquid has to be kept at a low pressure, too. However, the temperature of the liquid has to be chosen accordingly to avoid any boiling of it.

To allow the use of as wide a range of temperatures as may be desirable, and also of a wide range of pressure difference between the liquid and vapour side of the layer, the selectively permeable layer formed within the finely perforated sheet must have an accordingly higher tensile strength. For this purpose selectively permeable layers of water-insoluble polymeric hydrophilic material may be employed, formed in situ by pre-treating with a suitable liquid, as described above. This pre-formation may be advantageously carried out by applying a lower pressure "inside" the cell, for the reason just mentioned (forcing the liquid to flow only at one side of the finely perforated sheet). Once the layer has been formed, a relatively high pressure of the liquid may be used in treating the liquid being dehydrated. In this last case, and if the finely perforated sheet is of a highly flexible and more or less elastic nature, such as is the case with fine wire gauze it is advisable to provide for support at the outside (i.e. the vapour side) of that sheet. For example, a slab of porous or spongy solid material such as sintered metal, glass or plastic may be used for this purpose. This slab may be positioned at a short distance from, and parallel to, the finely perforated, flexible sheet, for example at a distance of 1 mm. or even less. When pressure difference is applied after having formed a selectively permeable layer in the perforated flexible sheet, this will stretch slightly and flatten out against the porous or spongy slab, thus being supported by it and prevented from being unduly stretched. Of course the application of this porous or spongy slab will usually obviate the use of a stream of gas as a means of maintaining a low vapour pressure at the vapour side of the selectively permeable film.

If care is taken that the surface of the porous or spongy slab is strongly water-repellent the slab may be in contact with the finely perforated, flexible sheet when this is in a non-stretched condition, and before there has been formed a selectively permeable layer in the perforated sheet. For this purpose the slab may be manufactured of strongly hydrophobic plastic-like polymeric polyalkene, for example "Teflon" or "polythene." Also the slab may consist of sintered non-water-repellent material, such as metal or glass, which throughout or only in the "outer skin" at the side of the liquid is made water-repellent by providing the surface of the interstices with a very thin coating of strongly water-repellent material, for example a long chain aminoalkane, or one of the hydrophobic materials already mentioned.

When using a slab of solid porous or spongy material which is, or by any treatment is made strongly hydrophobic, it is possible to have the outermost layer of this slab take the function of the finely perforated sheet in which the selectively permeable layer has to be formed. In this case a separate finely perforated sheet is unnecessary. For this purpose the outermost layer of the slab (say to a depth of 10 micron–100 micron) may be rendered or kept readily wettable by water. This can be achieved by using a slab of porous or spongy material which is in itself readily wettable by water, rendering the surface of all the interstices water-repellent by providing it with a very thin coating of water-repellent material (e.g. by passing vapours containing strongly water-repellent material through the slab) and dissolving or otherwise removing this coating in the outermost layer of the slab at the side of the liquid. Also a slab of strongly hydrophobic material may be made water-wettable in the outermost layer by providing the interstices in this outermost layer with a very thin water-wettable, but water-insoluble coating, such as a coating of cellulose acetate.

By the dehydration of liquids of vegetable or animal origin by the process of the invention the final product will generally contain 40–60% water. This means that, starting for example with a product of 90% water content, ±83–92% of the water has been removed by the process. The products obtained are very often well preserved, and the concentration of solid, preserving substances like sugars, alcohols, and salts will have increased in such a way that the concentrates are much less liable to deteriorate than the original fluids. Sometimes, as with concentrates of alcoholic beverages, the keepability will be virtually unlimited, and the concentrates may be marketed as such.

In many instances the concentrates can be subjected to further dehydration in order to obtain powdery products, such as instant coffee. This may be achieved by the usual methods, such as spray-drying. The main advantage is that during spray-drying concentrated liquids, in contrast with more diluted systems, lose very little of their aromatic components, and we have found that in spray-drying concentrated solutions obtained by the process of this invention, virtually all volatile organic substances will be retained. This advantage is not obtained when liquids are spray-dried before they are concentrated, since in this last case an appreciable part of the aromatic substance is lost.

The diffusion cell may, for example, consist of two sheets of fine wire gauze, stretched in a rectangular frame parallel to and at a distance of 1.5 mm. from each other. Between the sheets and in the direction of the liquid flow there are placed helices of wire, the helices having diameters of 1.5 mm., and the wire of which they are made having a diameter of about 0.35 mm. These helices act as spacers and are placed parallel to each other and about 4 cm. apart. They prevent the sheets from total collapse when the pressure at the liquid side (as required in many cases, see above) is lower than the pressure at the vapour side of the sheets.

The frame of each cell is provided at one side with means to introduce the liquid evenly between the sheets and at the other side with means to withdraw the liquid evenly. Apart from these openings the cell is completely closed and liquid-tight.

The cell is preferably used in a vertical position, with the side of the frame at which the liquid is introduced uppermost and in a horizontal position.

With reference to the drawings a preferred embodiment of a diffusion apparatus according to the invention will be explained by way of example.

Figure 1:
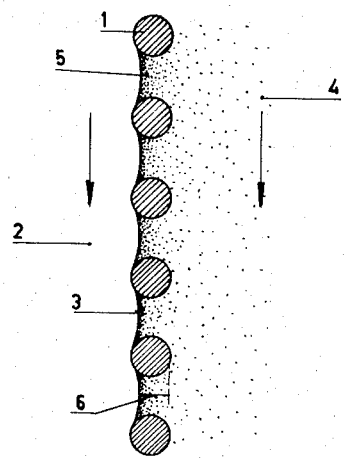
Figure 2:
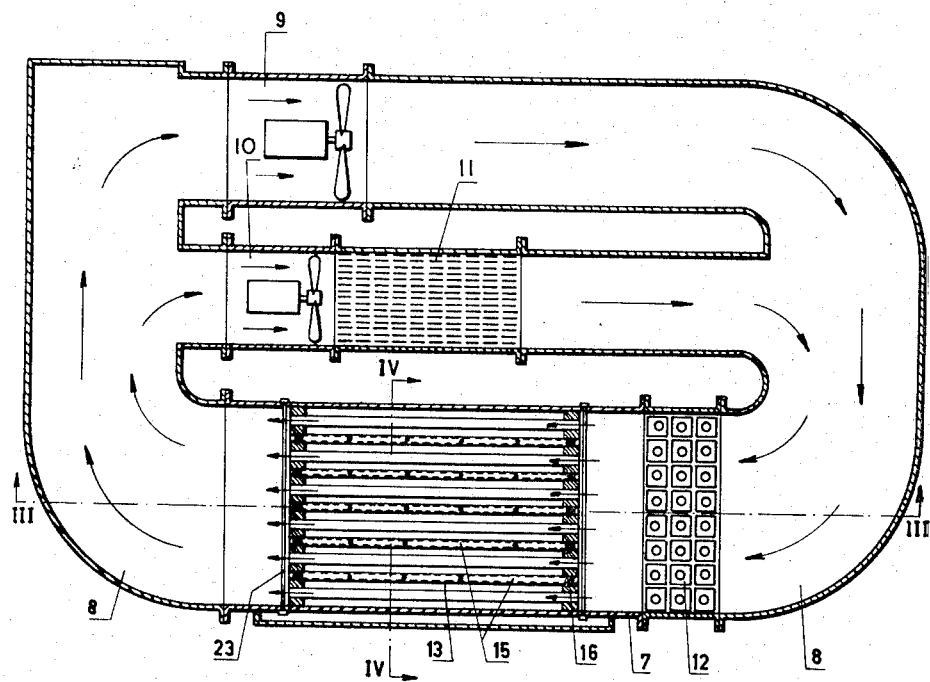
FIG. 2 is a plan view of the apparatus.
Figure 3:
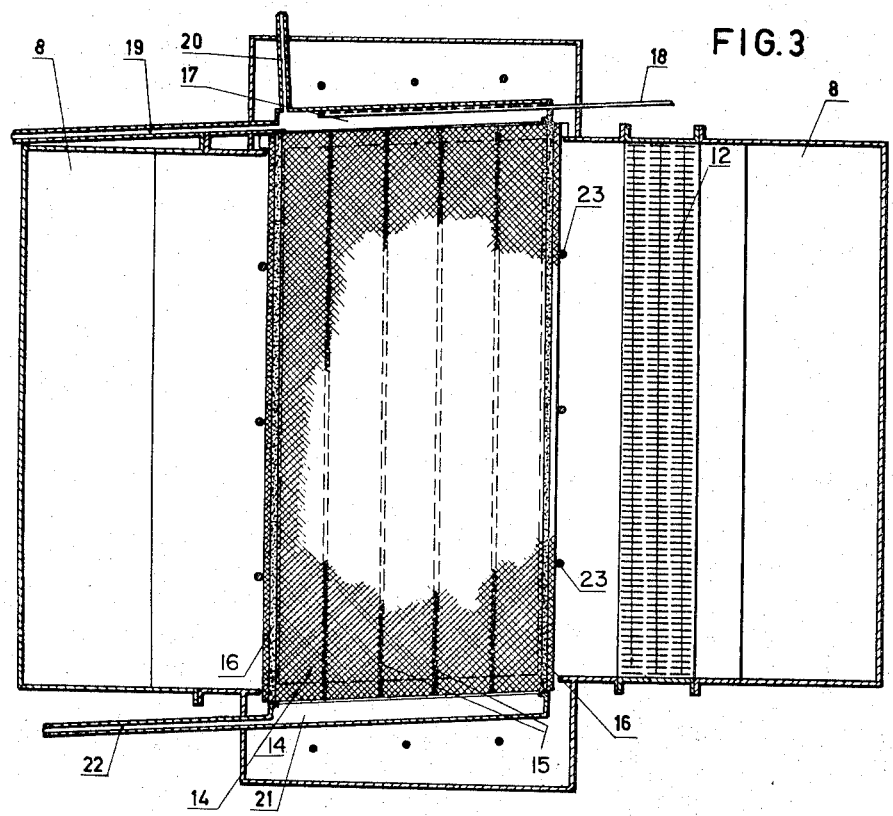
FIG. 3 is a section along the line III—III in FIG. 2, showing a diffusion cell and heat exchanger.
Figure 4:
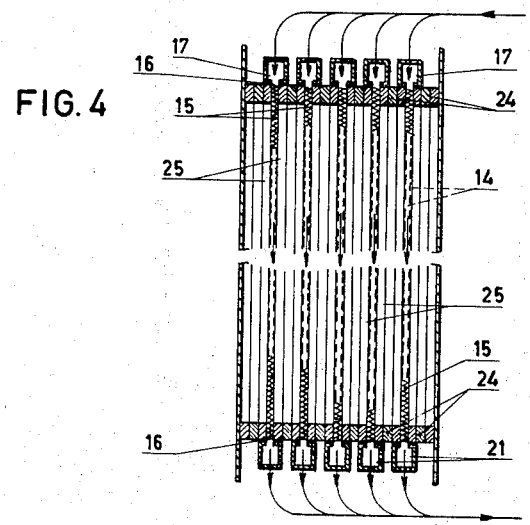
FIG. 4 is a section along the line IV—IV in FIG. 2, showing a battery of diffusion cells.

Dehydration according to the invention takes place in the diffusion battery, which is composed of 5 diffusion cells, 13, with an evaporating surface of 3 m.$^2$ for each cell. The evaporation is brought about by hot air flowing along these cells. The desired temperature level of the drying air is maintained by the steam heated air-heater 12. The circulation of this air takes place through the air circulation channels 8 and is maintained by ventilator 9. The water vapour which is given off to the air by the diffusion cells is removed by condensation in a closed circuit. The condensation is realized by circulating the moist air with the help of ventilator 10 through condenser 11, which is cooled by cold water. The battery of diffusion cells, ventilators and heat exchangers are placed in gas-tight casing 7.

The liquid to be dehydrated is fed to each diffusion cell through a feeding head 17 mounted on each cell, which is sealed by means of silicon rubber strips 16. From this head the liquid flows between the stainless steel gauzes 14 positioned about 1.5 mm. apart. A good distribution of the liquid along the inlet is effected by the perforations made in the supply pipe 18. The excess liquid is drawn off via overflow 19. A slight subatmospheric pressure between the gauzes of the cell is provided by connecting vacuum-tube 20 with a vacuum regulator adjusted at a subatmospheric pressure of about 10 cm. water. The partly dehydrated liquid is drawn off via the outlet 21, mounted against the cell in a gas-tight way by means of silicone rubber strips 16, and the attached discharge pipe 22.

The finely perforated sheet in which the selectively permeable layer of the diffusion cell is formed is obtained by stretching fine stainless steel gauze (230 mesh, wire diameter 35 microns) between the metal double frame 25. The diffusion cell is closed sideways by means of silicone rubber strips 16. The gauzes are spaced by vertical lengthwise spiralised steel wires placed at a distance of 4 cm. apart (outer diameter of the spiral 1.5 mm. and thickness of wire 0.35 mm.). Spacing strips 24 placed horizontally between the frames of the cells both on the lower side and on the upper side allow the passage of air along the cells. The diffusion cells and spacing strips are mounted together by connecting rods 23.

The required diffusion capacity of a diffusion apparatus is obtained by connecting in parallel several of the above-mentioned diffusion cells. For the dehydration of very dilute systems, containing, for example, about 5% by weight of dry substance to 60% by weight of dry substance, it is advisable—in order to decrease the mean residence time of the liquid to be dehydrated—to compose the diffusion apparatus of a number of sections, in which each section is composed of several diffusion cells. The required liquid througput between the sheets is obtained by recirculating part of the liquid continuously fed to the section and feeding the overflow of this section continuously to the second section, etc. Thus a stepwise increase of the concentration of the liquid is obtained from one section to another. The more sections there are for a given total number of cells, the lower the mean residence time of the liquid in the apparatus will be.

Example 1

Coffee extract obtained by the extraction of ground roasted coffee beans with hot water, was dehydrated in the diffusion apparatus described above.

The extract was fed to the diffusion cells by an adjustable dosing pump. The liquid flowing in the cells was recirculated by means of a centrifugal pump.

Under the influence of the cohesion forces of the liquid and the applied vacuum between the gauzes (of 10 cm. water), the average thickness of the liquid film was 1 mm.; the liquid content of the diffusion cell/m.$^2$ surface consequently amounted to 0.5 litre.

The temperature of the extract was 20° C., the concentration 10% by weight of dry substance and the feed-rate was 104 kg. liquid/hour. After the desired slight subatmospheric pressure of the liquid between the gauzes had been obtained, an air-current heated to a temperature of 100° C. was conducted along the cells. By the dehydrating action of the air an extremely thin membrane of dried coffee extract was quickly formed in the gauze. The temperature of the extract in the diffusion cell cell was 60° C. The discharge rate amounted to 29 kg. liquid/hour with a dry substance content of 35.7% by weight; the diffusion capacity per m.$^2$ surface of the cell consequently amounted to 5 kg. water/hour.

Example 2

In the diffusion apparatus described above a weakly alkaline 5% gelatin solution in water was circulated. After a slight subatmospheric pressure in the flowing liquid had been obtained, air at a temperature of 110° C. was led along the gauzes. As soon as a gelatin membrane had formed in the gauzes the gelatin solution in the system was replaced by fresh 10% aqueous extract of coffee. At a feed rate of 100 kg. of cold liquid per hour the temperature of the extract in the cells was 63° C. and the output amounted to 33.5 kg. liquid/hour with a dry substance content of 32.8% by weight. The selective dehydration capacity amounted to about 5.1 kg. water/hour/m.$^2$ surface.

Example 3

In the diffusion apparatus described above plum juice with a dry substance content of 11% by weight was circulated. After a slight subatmospheric pressure had been reached in the cells, air at a temperature of 90° C. was led along the gauzes. At a feed of 115 kg. of cold plum juice per hour the temperature of the juice in the cells was 48° C. Under these conditions the diffusion capacity amounted to 4.1 kg. water/hour/m.$^2$ surface, while the pure plum flavour was retained.

During this experiment it was found that selectively permeable membrane derived from plum juice displays also an excellent selective permeability for other flavour-containing systems, for example, extract of coffe, apple juice, etc.

Example 4

Coffee extract, obtained by extraction of ground roasted coffee beans with hot water, was dehydrated in the diffusion apparatus described above. Before the coffee extract was fed to the apparatus a primary film of carboxymethylcellulose was formed in the gauze of the cells. The carboxymethylcellulose had a high molecular weight and a low degree of substitution; with a solution of 1.5% by weight the viscosity at 30° C. was 200 centipoises. The carboxymethylcellulose solution was circulated through the cells in a concentration of 3% by weight, the temperature of the liquid being 60° C. As soon as the whole surface of the gauze had been moistened and a subatmospheric pressure of 10 cm. water had been obtained in the liquid flowing between the gauzes, dry air with a temperature of 110° C. was circulated along the cells. After a solid layer had formed in the gauze, the carboxymethylcellulose containing solution was replaced by acidified water with a pH value of 2. By this acidification the layer became water-insoluble.

The curing process was stopped after 5 minutes and the acidified water replaced by water at pH 7. As soon as the pH of the water had increased to 5 the extract of coffee was fed into the cells.

The feed temperature of the extract was 18° C., and the feed rate amounted to 76 kg. extract per hour. The temperature of the air was maintained at 110° C. Under these conditions the temperature of the liquid in the cells was maintained at a value of 62° C.

On organoleptic judgment of the concentrated extract of coffee, this extract appeared not to have changed qualitatively with regard to the untreated extract.

Example 5

A water-insoluble layer of carboxymethylcellulose was made as described in Example 4.

Instead of coffee extract, a solution containing 0.5% by weight of methylethyl ketone in water was fed into the apparatus. The feed rate was again about 76 kg. liquid per hour at 18° C. The temperature of the circulating liquid in the cells was 59° C. The discharge rate was under these conditions 10 kg. liquid per hour. The dehydration capacity therefore amounted to 4.4 kg. water per m.$^2$ of diffusion surface per hour.

By means of gas chromatographic analysis a concentration of 3.46% by weight of methylethyl ketone was measured in the discharge of the apparatus. At a more than septuple concentration of the liquid the methylethyl ketone retention consequently appeared to be 91%.

A feature of the process as described is that renewal of the selectively permeable layer is carried out by a very simple and advantageous means, for example by dissolution or washing away of the layer followed by its re-formation as hereinbefore described. The advantage of forming the layer in this way is that its renewal can conveniently be accomplished without opening and resealing the apparatus, and this in turn reduces the risk of bacterial contamination, which is particularly important in the processing of foodstuffs.

We claim:
1. A process for the concentration of an aqueous liquid comprising:
   (i) causing a liquid containing an organic hydrophilic material to flow,
   (ii) restricting the flow in a surface layer of the liquid and withdrawing water from said surface layer by means of a gaseous phase of relatively low water vapor pressure in contact with the surface of said layer thereby causing the organic hydrophilic material to accumulate in said surface layer and form in situ a layer which is selectively permeable to water, and (iii) maintaining the aqueous liquid to be concentrated in contact with one surface of the selectively permeable layer so formed and maintaining a gaseous phase of relatively low water vapor pressure in contact with the other surface of the selectively permeable layer thereby causing water to be removed from the aqueous liquid to be concentrated.

2. A process according to claim 1, in which the liquid containing the organic hydrophilic material is the aqueous liquid to be concentrated.

3. A process according to claim 1, in which the organic hydrophilic material includes finely dispersed structurized material which in itself has selectively permeable properties.

4. A process according to claim 1, in which the liquid containing the organic hydrophilic material and the aqueous liquid to be concentrated are each caused to flow in a thin layer.

5. A process according to claim 1, in which the flow of the liquid containing the organic hydrophilic material is restricted by contacting the surface layer of said liquid with a fixed discontinuous surface of a material inert under the conditions of the process.

6. A process according to claim 5, in which the discontinuous surface defines a plurality of openings having a surface area of 25 $\mu^2$ to 10,000 $\mu^2$ each.

7. A process according to claim 6, in which the openings in the discontinuous surface are from 10 $\mu$ to 100 $\mu$ in depth.

8. A process according to claim 1, in which the selectively permeable layer formed is subjected to curing treatment before the aqueous liquid to be concentrated is brought into contact with said layer.

9. A process according to claim 1, in which the relatively low water vapor pressure of the gaseous phase in contact with the other surface of the selectively permeable layer is created by the maintenance of a total pressure in the gaseous phase which is substantially lower than the equilibrium water vapor pressure, at the surface of the selectively permeable layer, of the aqueous liquid to be concentrated.

10. A process according to claim 1, in which the relatively low water vapor pressure of the gaseous phase in contact with the other surface of the selectively permeable layer is created by positioning a condensing surface, which is colder than the aqueous liquid to be concentrated, at a short distance from the selectively permeable layer.

11. A process according to claim 5, in which the pressure at the side of the selectively permeable layer in contact with the aqueous liquid to be concentrated is lower than the pressure at the side of said layer in contact with the gaseous phase, and the difference in pressure is so adjusted to the surface tension of the liquid within the discontinuities in the fixed surface and to the size of said perforations, that the surface layer of the liquid cannot be broken by said pressure difference.

References Cited
UNITED STATES PATENTS

| | | | |
|---|---|---|---|
| 1,885,393 | 11/1932 | Van Schaack | 210—22 |
| 2,018,049 | 10/1935 | Allen | 203—49 |
| 2,386,826 | 10/1945 | Wallach et al. | |
| 2,411,238 | 11/1946 | Zender | 99—205 X |

A. LOUIS MONACELL, *Primary Examiner.*

D. M. NAFF, *Assistant Examiner.*